R. N. CHAMBERLAIN.
STORAGE BATTERY GRID AND PLATE AND PROCESS OF MAKING SAME.
APPLICATION FILED MAR. 14, 1914.
1,236,672.                                   Patented Aug. 14, 1917.
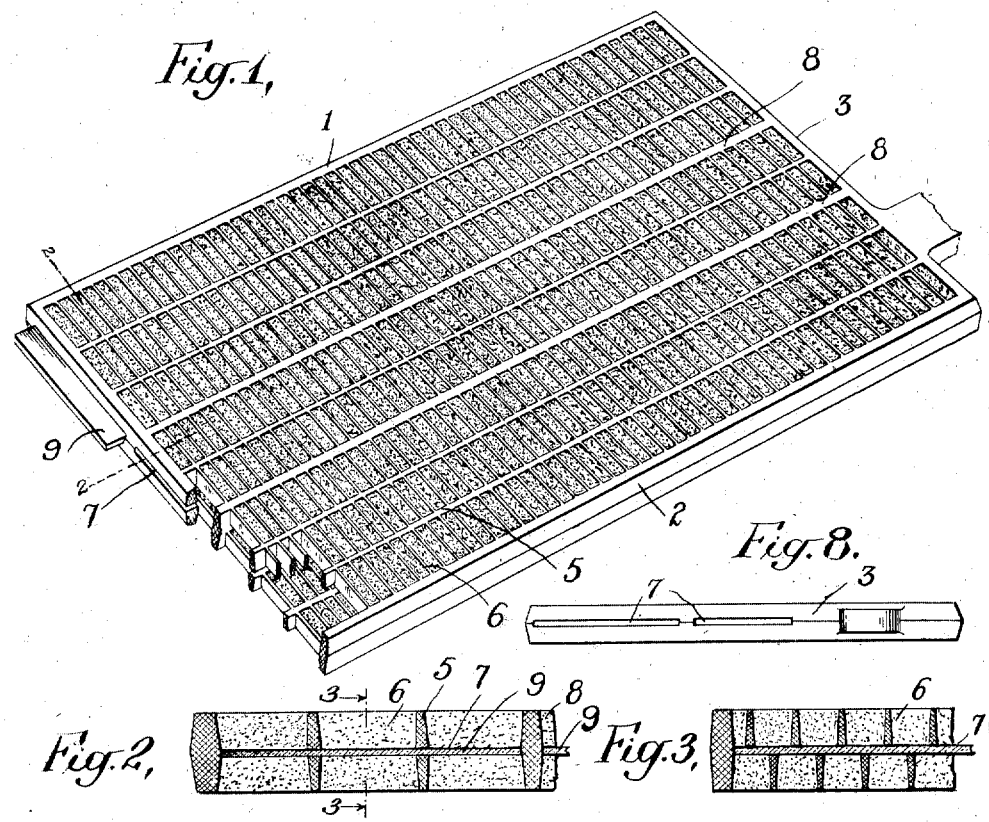
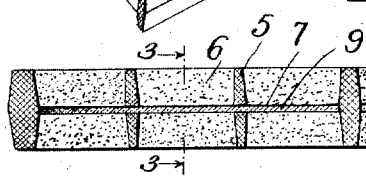 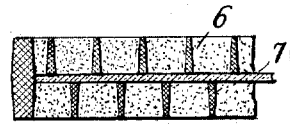
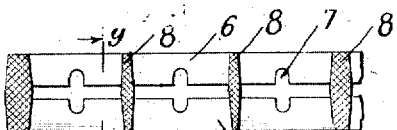 
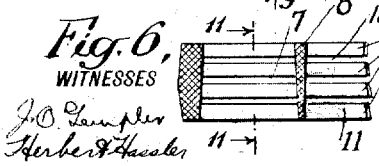 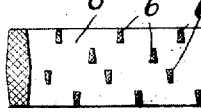
INVENTOR,
Rufus N. Chamberlain
BY
Kenyon & Kenyon
his ATTORNEYS

UNITED STATES PATENT OFFICE.

RUFUS N. CHAMBERLAIN, OF CHICAGO, ILLINOIS, ASSIGNOR TO GOULD STORAGE BATTERY COMPANY, A CORPORATION OF NEW YORK.

STORAGE-BATTERY GRID AND PLATE AND PROCESS OF MAKING SAME.

1,236,672. Specification of Letters Patent. Patented Aug. 14, 1917.

Application filed March 14, 1914. Serial No. 824,599.

*To all whom it may concern:*

Be it known that I, RUFUS N. CHAMBERLAIN, a citizen of the United States, and a resident of the city of Chicago, county of Cook, and State of Illinois, have invented certain new and useful Improvements in Storage-Battery Grids and Plates and Processes of Making Same, of which the following is a specification.

My invention relates to grids for, as well as, storage battery plates, and the main object of my invention is to obtain a plate adapted to give an increased capacity for a given weight. Plates made according to my invention are particularly useful when employed as positives because in many cases the capacity of a battery cell is determined by the capacity of the positive plates, the negatives having greater capacity for any given weight or thickness than the positives.

According to the preferred form of my invention I form the grid for the plate of an integral piece, preferably by casting it, and thereafter mechanically apply thereto active material or material adapted to be rendered active. The above grid is cast with one or more, preferably several, internal spaces or acid chambers which are preferably in communication with the exterior of the plate through the border of the plate, although communication may be had through other parts of the finished plate or only through the pores of the active material. These internal spaces or chambers are preferably centrally disposed in the grid and so arranged as to lie vertically in the plate when it is in use. During the application of active material to the grid cores of suitable form are inserted in the spaces or chambers so that they will be kept free of active material. Afterward the cores may be removed and the spaces or chambers are then adapted to contain electrolyte and bring it directly into contact with the surfaces of the interior active material. These spaces or chambers may be left open to the main body of electrolyte after removing the cores, or the opening in the border through which the cores were inserted may be sealed up in any suitable way so that there will be a closed chamber in the interior of the plate. Though this chamber is then in communication with the electrolyte only through the pores of the active material the many advantages are maintained. Plates constructed as above set forth have a much larger capacity for given weight or space than plates without such internal spaces or chambers even though a plate without such chambers is of the same or of greater thickness.

Referring to the drawings,

Figure 1 illustrates one form of grid embodying my invention;

Fig. 2 is an enlarged cross-section on the line 2—2 of Fig. 1, showing the plate after the active material has been applied but before the core has been removed;

Fig. 3 is an enlarged cross-section of a portion of the plate on line 3—3 of Fig. 2;

Figs. 4 to 7, inclusive, are cross-sections similar to Figs. 2 and 3, showing, however, a modified form of the grid before active material is applied thereto and without the core; and Fig. 8 is an elevation of the top edge of the plate showing one end of the grid.

The grid, as shown in Fig. 1, is an integral casting of lead or other suitable metal or alloy produced by ordinary casting processes. It is supplied with ribs 5 and 8 connecting the top and bottom members. At right angles to the ribs 5 and 8 are the face frame members 6 forming pockets for carrying active material. The ribs 5 and the face frame members 6 are duplicated on each side of the plate leaving a space between them which acts as an acid channel.

My invention is not limited to the angle of the ribs 5 and face frame members 6 as shown.

It will be seen from this that there are two sets of pockets for the reception of active material or material adapted to be rendered active and that these sets of pockets are kept at a fixed relation with each other by the borders and ribs 8 which extend with the top, bottom and side frame members the full thickness of the grid. The construction of the grid is such that there is an acid chamber 7 between the two sets of pockets. In order to maintain the width of this chamber throughout the grid, some of the ribs as 8, preferably of greater cross-section than the other ribs, are continued all the way through the length and thickness of the grid. In the specific form of grid shown in Figs. 1, 2, 3 and 8 there are three acid chambers 7 which pass through the plate along its major axis.

two of which pass through the top border, while all three pass through the bottom border of the grid. 9—9 represent the cores lying in the chambers while active material is being applied. The cores should be of some material which will not stick to the active material so that the cores may be removed without destroying the surface of the active material. I have found that paraffined cardboard or the like is suitable for this purpose. In practice the chambers are from a thirty-second of an inch to a sixteenth of an inch thick, although I do not intend to limit myself within this range of dimensions.

If a core is employed of such a character as to be pervious to the electrolyte it will not be necessary to remove the core but it may remain in the plate during the use of the same.

Figs. 4 and 5 represent a modification of the grid showing a different form of acid chamber. It is apparent that these chambers may take various forms other than those represented in these figures. The openings 7 shown in Figs. 4 and 5 are produced in the grid during the casting by the use of a core having the shape of the openings. The same core may be used in pasting the plate and when removed will leave acid channels throughout the plate of the configuration shown in Figs. 4 and 5. The corresponding parts in these figures have been numbered the same as in Figs. 1, 2 and 3, and the construction of each of the modifications will be apparent upon a reading of the description of Figs. 1, 2 and 3.

In the construction shown in Figs. 6 and 7 there may be a core placed between each series of face frame members 6 when the active material is being pasted on, which, upon removal of the cores, would result in an acid chamber between each series. I prefer, however, that there shall be an acid channel between the inner series only and that the active material shall fill all the remaining space leaving only a chamber between the two inner series of face frame members.

The modification shown in Figs. 6 and 7 is somewhat similar to that shown in Figs. 2 and 3, except that there may be added two chambers 10 and 11, and the further change that each of the ribs 8 extends throughout the entire thickness of the grid.

Having described my invention, what I claim as new and desire to secure by Letters Patent is:—

1. A grid for storage battery plates integral throughout having a plurality of parallel members each of which has a set of pockets for the reception of active material or material adapted to be rendered active with a space between said sets of pockets and a rib connecting said parallel members.

2. A grid for storage battery plates having top, bottom and side frame members and a plurality of parallel members spaced apart, each of which has a set of pockets for the reception of active material, or material adapted to be rendered active, and a rib connecting the top and bottom members and with them extending the full thickness of the grid and rigidly maintaining a space between said sets of pockets.

3. A grid for storage battery plates having top, bottom and side frame members and a plurality of parallel members spaced apart, each of which has a set of pockets for the reception of active material, or material adapted to be rendered active, a rib connecting the top and bottom members and with them extending the full thickness of the grid and rigidly maintaining a space between said sets of pockets and a plurality of face frame members connecting said ribs with each other and with the side members.

4. A storage battery plate comprising a grid, integral throughout, having two sets of pockets for reception of active material or material adapted to be rendered active, a single space between said sets of pockets and active material in said pockets and a rib connecting said sets of pockets.

5. A storage battery plate comprising a grid formed of a single lead casting having two sets of pockets, a rib extending the width of said plate and connecting said pockets, active material in said pockets and said plate having an internal vertical chamber communicating with the border of the plate and adapted to place the electrolyte in direct communication with interior active material.

6. A storage battery grid in the form of top, bottom and side frame members, a series of ribs connecting the top and bottom members and with them extending the full thickness of the grid, a plurality of face frame members spaced apart and integrally connecting the ribs with each other and with the side members.

7. A storage battery grid in the form of top, bottom and side frame members, a series of ribs connecting the top and bottom members and with them extending the full thickness of the grid, a plurality of face frame members spaced apart and integrally connecting the ribs with each other and with the side members and disposed in the form of two series of plates spaced apart to form a plurality of compartments.

8. A storage battery grid in the form of top, bottom and side frame members, a series of ribs connecting the top and bottom members and with them extending the full thickness of the grid, a series of ribs connecting the top and bottom members but not extending through the thickness of said grid, a plurality of face frame members spaced apart and integrally connecting all of said ribs to each other and to the side frame members.

9. A grid for storage batteries comprising a plurality of ribs connecting the top and bottom thereof, a plurality of face frame members at an angle to said ribs and connecting the ribs together and to the sides of said grid, some of said ribs extending the full thickness of said grid and the others of said ribs and said face frame members extending only part way through the thickness of said grid thereby forming a plurality of spaced-apart series of pockets for active material.

10. A storage battery grid integral throughout comprising top, bottom and side frame members, a plurality of ribs connecting said top and bottom members and with them extending the full thickness of the grid, a plurality of ribs parallel with said first ribs and being of less thickness than said grid, a plurality of face frame members connecting said ribs together and also connecting them to the side frame members, thereby forming a plurality of openings through said grid adapted to be filled with individual sections of active material with an acid space between opposite sections of said active material.

11. A storage battery grid integral throughout comprising top, bottom and side frame members, a rib connecting said top and bottom members intermediate said side members and with them extending the full thickness of said grid, a second rib connecting said top and bottom members intermediate said first rib and one of said side members and flush with one face of said grid but of less thickness than the grid, another rib connecting the top and bottom members intermediate the same rib and side members as the second rib and flush with the other face of said grid and a plurality of face frame members of equal thickness with said last-mentioned ribs and connecting said ribs to the first rib and said side members and an internal space separating said last-mentioned ribs and face frame members.

12. A battery electrode consisting of a grid in the form of top, bottom and side frame members, a series of ribs connecting the top and bottom members and with them extending the full thickness of the electrode, two series of face frame members spaced apart and integrally connecting the ribs with each other and with the side members, and active material filling the spaces between the ribs of each side and disposed in the form of two series of plates spaced apart to form a plurality of compartments.

13. The method of making a battery electrode which consists in forming a grid with two parallel, open work members spaced apart, placing a core between said members, filling with active material the spaces defined by each face of the core and the walls of the openings in each of said members, and withdrawing the core.

In testimony whereof, I have signed my name to this specification, in the presence of two subscribing witnesses.

RUFUS N. CHAMBERLAIN.

Witnesses:
NEWTON O. BURGESS,
EDWIN SEGER.